June 23, 1970   E. LLOYD   3,517,237
SELF-STARTING SYNCHRONOUS ELECTRIC MOTORS
Filed April 30, 1968

United States Patent Office

3,517,237
Patented June 23, 1970

3,517,237
SELF-STARTING SYNCHRONOUS ELECTRIC MOTORS
Eric Lloyd, Swindon, England, assignor to Garrard Engineering Limited, Swindon, Wiltshire, England, a British company
Filed Apr. 30, 1968, Ser. No. 725,372
Claims priority, application Great Britain, May 2, 1967, 20,375/67
Int. Cl. H02k 21/00
U.S. Cl. 310—162                                       1 Claim

ABSTRACT OF THE DISCLOSURE

In a synchronous induction motor whose rotor has, axially mutually adjacent, within the stator a squirrel-cage induction portion and a permanently magnetised annular ferrite disc, and outside the length of the stator a metal balancing ring, the balancing ring has a centre bore fitting the rotor shaft, and the annular disc magnet is adhesively secured to the adjacent faces of both the induction portion and of the balancing ring, being centred by utilising its outer cylindrical surface.

---

Figure 1:
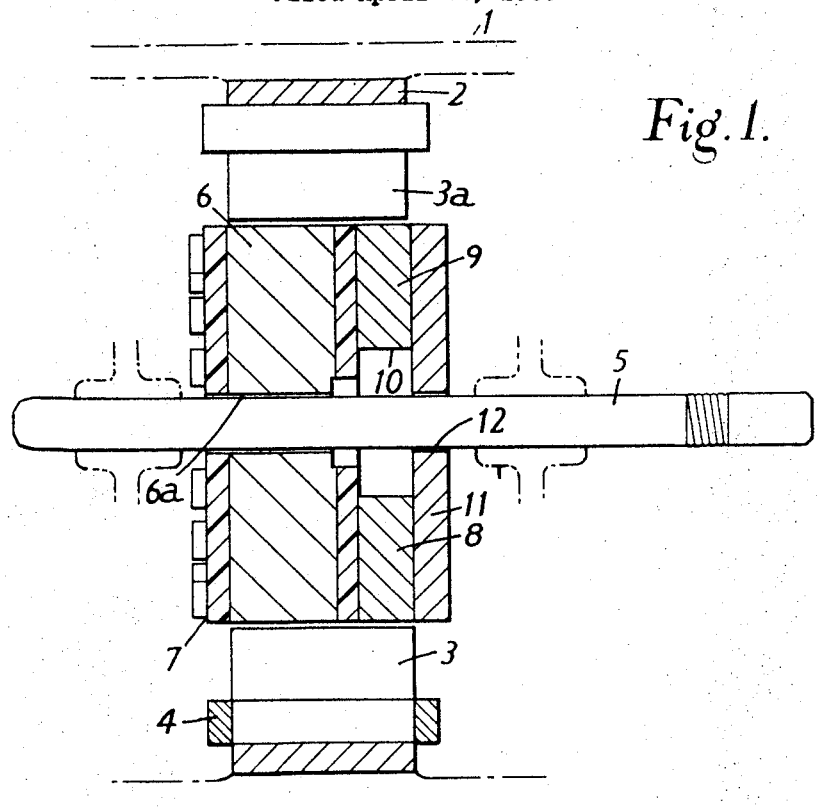

This invention relates to self-starting synchronous electric motors of the kind in which an induction rotor, generally a squirrel-cage rotor, is equipped with a coaxially mounted disc magnet of ceramic material, generally ferrite which magnet is coaxially aligned with the induction rotor and rotates jointly with the latter in the stator field, the rotor further comprising a non-magnetic balancing disc, arranged closely adjacent to the ceramic disc and consisting of material which can be readily machined.

Motors of the kind specified have been found advantageous for the drive of gramophone turntables, in which case they are generally constructed as shaded-pole single-phase motors, and the present invention has for an object to provide an improved rotor for a motor of the kind specified, which lends itself to inexpensive manufacture. In addition the invention in its preferred form provides an improved method and apparatus for the construction of such rotor which permit accurate axial alignment of the ceramic disc with the inductance part of the rotor to be achieved in a relatively simple and inexpensive manner.

According to the invention the balancing disc is made with an accurately machined centre bore so as to be readily alignable with the induction part of the armature by assembling the two on the motor shaft or on a dummy shaft engaging the centre bores both of the induction part of the armature and of the balancing disc, and a ceramic disc magnet, having a bore of sufficient diameter to clear the shaft, is secured by adhesive at one of its faces to the induction part of the rotor and on its other face to the balancing disc, the disc magnet being centred relative to both by utilisation of its outside circumference.

Preferably the disc magnet is first secured to the balancing disc after being centred relative to the latter with the help of a fixture co-operating with the outer circumference of the ceramic disc magnet and with the bore of the balancing ring, and this sub-assembly is then secured to the induction part of the rotor while being centred relative thereto by a shaft which engages the centre boxes of the balancing ring and of the induction part of the rotor.

Another aspect of the invention thus consists in an assembly fixture for assembling a ceramic disc magnet with a balancing disc for a synchronous induction motor of the kind specified, which fixture comprises a flat mounting surface from which projects a shaft element fitting into the axial bore of such balancing disc, and means adapted to co-operate with the outer circumference of the ceramic disc magnet for locating said disc on said mounting surface with the circumference of the disc coaxial with the shaft member the length by which the shaft projects being sufficient to centralise the balancing disc when the latter is placed on the free end surface of the thus located disc magnet. The mounting surface is conveniently arranged to form an end face of a plunger having the same diameter as the disc magnet and preferably arranged in a cylindrical bore of an outer fixture member, the diameter of the bore being substantially equal to the maximum outside diameter within the tolerance range of the disc magnet, and the plunger being slidable in this bore so as to be usable for ejection of the disc-magnet and balancing-disc sub-assembly after these two have been mutually fixed by adhesive. Although various types of adhesives, including more particularly epoxy adhevise, can be used, the use of a contact adhesive offers the advantage of limiting the time of occupation of the fixture to a minimum. The fixture may be further equipped with a pressure pad by which pressure may be applied to assist the adhesive attachment of the balancing disc to the disc magnet.

In the accompanying drawing

Figure 2:
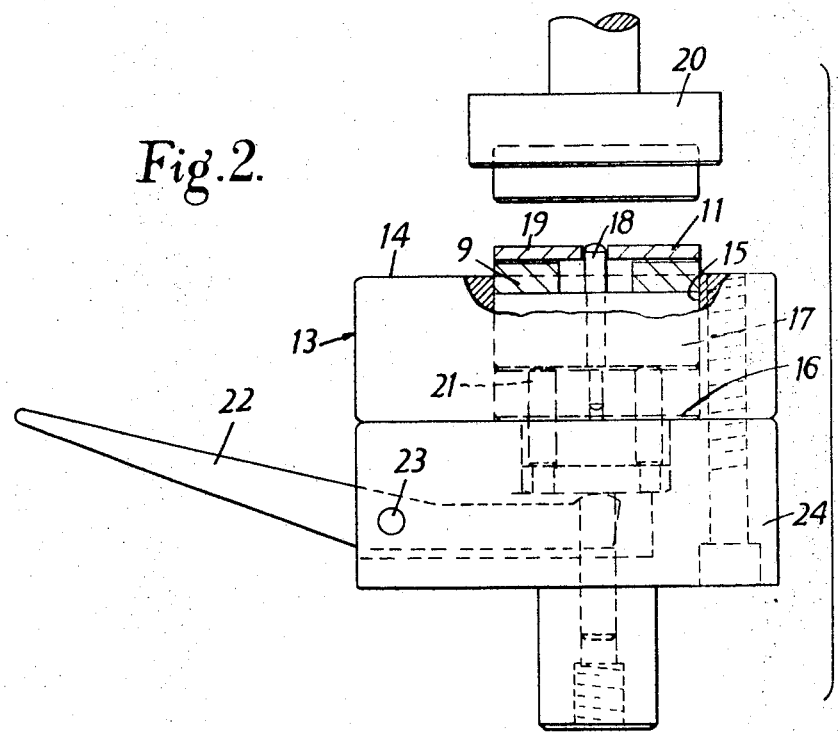

FIG. 1 is an axial section of a synchronous induction motor having a composite rotor according to the present invention, and FIG. 2 is a side elevation, partly in section, of a fixture for assembling the disc magnet to the balancing ring.

Referring now first to FIG. 1, a synchronous induction motor has a stator and a rotor. The stator is mounted in a housing 1, symbolically indicated in chain-dotted lines and comprises a ferromagnetic stator body 2 having, for example, two diametrically oppositely arranged poles, each comprising a main-pole portion 3 formed integral with a so-called shaded portion 3a, the latter following the main-pole portion 3 in the direction of rotation and being fitted with a shading ring 4 to cause its flux to lag in phase behind the flux through its associated main-pole portion. The rotor is mounted on a shaft 5 and comprises three portions arranged axially adjacent to each other. One of these portions is an induction rotor member 6 of squirrel-cage construction, which has a centre bore 6a that fits on the shaft 5, and which has metal end plates 7 and 8. The next adjacent portion is a permanently magnetised ceramic disc magnet 9 of suitable ferrite material. This disc magnet has a centre bore 10 whose diameter is substantially greater than the outside diameter of the shaft 5. One end face of this disc magnet 9 is secured by adhesive to the outer side of the metal end plate 8 associated with the induction rotor member 6. It is secured in such a position that the outer cylindrical surface of the disc magnet 9 is coaxial with the shaft 5. These two portions 6 and 9 are both accommodated within the length of the pole pieces 3, 3a. The remaining portion of the rotor is a so-called balancing disc member 11 constituted by an annular body of a metal which can be readily machined. The balancing disc member is arranged beyond the length of the pole pieces 3, 3a. Similarly to the induction rotor member 6, it has a central bore 12 which fits on the outside diameter 5 of the shaft so as to centre the disc 6 accurately relative to the shaft 5 and thus also relative to the induction portion 6 of the rotor, the balancing disc member is adhesively secured to the other end face of the disc magnet 9.

While it is possible to assemble the rotor by first securing the ferrite disc 10 to the induction rotor member 6 of the motor, using the outer circumference of each for mutual centering after the outer circumference of the induction member has been machined to the accurate desired diameter in accurate alignment with its centre 6a and then to secure the balancing disc member 11 to the other side of the disc magnet 9, utilising the co-operation of its bore 12 with the shaft 5, or with a mandrel of the same diameter, temporarily inserted into the bore 6a of the induction portion, to achieve alignment of the balancing disc member with the cylindrical outer surface of the disc magnet 9 and with the induction rotor member 6 of the rotor, we have found it more convenient to first form a sub-assembly of the disc magnet 9 and balancing disc member 11 by adhesively securing the two together, utilising the outer diameter of the disc magnet and the bore 12 of the balancing disc member for their mutual axial alignment, whereafter this sub-assembly is adhesively secured to the induction rotor member of the rotor, using the shaft 5 or a mandrel of similar diameter for their mutual alignment.

FIG. 2 shows a fixture suitable for effecting the sub-assembly operation.

Referring now to FIG. 2, the illustrated fixture comprises a main body 13 having a flat upper surface 14 which is provided with a cylindrical bore 15 whose diameter is equal to, or very slightly larger than, the maximum tolerance of the outside diameter of the disc magnets 9 for whose assembly with their associated balancing discs 11 the fixture is intended. This bore terminates in a flat bottom surface 16 at a depth substantially greater than the axial length of the sub-assembly of a disc magnet 9 and its associated balancing disc 11, and it contains a cylindrical plunger 17 which is axially slidable in the bore, and whose axial length corresponds to the excess of the length of the bore 15 to the surface 16 over the length of the sub-assembly. The upper end surface of the plunger 17 serves as a mounting surface for a disc magnet 9 and is provided with a central guide pin or mandrel 18 projecting by a length equal to, or slightly less than, the axial length of the sub-assembly, the diameter of the pin 18 being equal to that of the shaft 5 on which the rotor is to be mounted.

It will thus be readily appreciated that when the plunger 17 rests on the surface 16, and a disc magnet 9 is placed into the bore 15 on the mounting surface of the plunger 17, the disc magnet will be accurately centred relative to the pin 18 by the co-operation of its outer circumference with the bore 15, and that there remains in the bore an unoccupied end portion of the pin 18 sufficient to accommodate a balancing ring 11 as well as a layer 19 of adhesive for securing the balancing ring to the disc magnet while, due to the engagement of the mandrel pin 18 with the centre bore of the balancing disc, the balancing disc 11 will also be accurately centred relative to the pin 18.

When the parts have been thus inserted, a pressure pad 20 is applied to the outer end surface of the balancing disc 11 to ensure that the latter is accurately parallel to the magnet disc 9 and to also ensure intimate contact of both with the adhesive layer 19.

The fixture is finally equipped with an ejector mechanism for the completed sub-assembly. This mechanism comprises ejector pins 21 acting upon the plunger 17 and so operable by a hand lever 22 pivoted at 23 in a lower jig portion 24, that depression of the hand lever 22 after withdrawal of the pressure pad 20 will raise the sub-assembly over the surface 14 of the body 13 for ready removal. If desired, the pin 18, instead of moving with the plunger 17, may be secured in the lower fixture portion 24 and be guided in a clearance bore of the plunger 17, so that the ejection movement of the plunger also causes the pin 18 to be withdrawn from the sub-assembly.

The completed sub-assembly can be readily attached to the induction portion 6 of a rotor, either by placing a mandrel of substantially the same diameter as the shaft 5 into the centre bore 6a of the induction portion 6 and using this mandrel for centering the sub-assembly relative to the induction portion 6, or preferably by assembling the sub-assembly with an induction portion which has already been fixed on its shaft 5 and using this shaft 5 itself for centering the sub-assembly by engagement of the shaft 5 with the centre bore 12 of the balancing disc 11 of the sub-assembly.

What I claim is:

1. A self-starting synchronous electric motor of the kind having a rotor which is mounted on a rotor shaft and comprises an indication member, a disc magnet of ceramic material which has a bore of sufficient diameter to clear the shaft, and which is coaxially aligned with, and adhesively secured at one of its faces to, the induction member and rotates jointly with the latter in a stator field, and a non-magnetic balancing disc arranged closely to the ceramic disc and consisting of material which can be readily machined, wherein the induction member and the balancing disc each have an accurately machined centre bore engaging the rotor shaft, the disc magnet being secured by adhesive at its other face to the balancing disc.

References Cited

UNITED STATES PATENTS

| 1,226,091 | 5/1917 | McCollum | 310—112 |
| 2,784,331 | 3/1957 | Rodemann | 310—162 |
| 3,173,042 | 3/1965 | Fodor | 310—114 |
| 3,209,185 | 9/1965 | Draper. | |

WARREN E. RAY, Primary Examiner

R. SKUDY, Assistant Examiner

U.S. Cl. X.R.

310—156, 181